US005358009A

United States Patent [19]

Cambell

[11] Patent Number: 5,358,009
[45] Date of Patent: Oct. 25, 1994

[54] LIQUID STORAGE VESSEL VENTING SYSTEM

[76] Inventor: Gary J. Cambell, 6480-10th Ave., Blanchard, Mich. 49310

[21] Appl. No.: 93,765

[22] Filed: Jul. 19, 1993

Related U.S. Application Data

[63] Continuation-in-part of Ser. No. 788,542, Nov. 6, 1991, Pat. No. 5,240,043.

[51] Int. Cl.$^5$ .............................................. A01G 25/09

[52] U.S. Cl. .................................. 137/899; 137/209; 137/557; 137/589

[58] Field of Search ................ 137/589, 557, 899, 209

[56] References Cited

U.S. PATENT DOCUMENTS

| | | | |
|---|---|---|---|
| 1,004,982 | 10/1911 | Budlong | 137/209 |
| 2,947,330 | 8/1960 | Savage | 141/1 |
| 3,225,696 | 12/1965 | Brigman | 103/6 |
| 3,472,482 | 10/1969 | Gardner | 251/89.5 |
| 3,674,061 | 7/1972 | Calisher et al. | 141/198 |
| 4,192,347 | 3/1980 | Richard | 137/614.06 |
| 4,239,054 | 12/1980 | Van R n | 137/209 |
| 4,420,022 | 12/1983 | Landry | 141/18 |
| 4,553,573 | 11/1985 | McGarrah | 141/98 |
| 4,606,476 | 8/1986 | Pocock et al. | 222/148 |
| 4,641,693 | 2/1987 | Rakucewicz | 141/98 |
| 4,683,921 | 8/1987 | Nesser | 141/141 |
| 4,862,931 | 9/1989 | Vella | 141/141 |

FOREIGN PATENT DOCUMENTS

| | | | |
|---|---|---|---|
| 71397 | 3/1893 | Fed. Rep. of Germany | 137/209 |
| 1049733 | 1/1952 | France | 137/209 |

*Primary Examiner*—A. Michael Chambers
*Attorney, Agent, or Firm*—Price, Heneveld, Cooper, DeWitt & Litton

[57] ABSTRACT

A check valve assembly is provided for a liquid storage vessel, such as a tank. The system includes a housing for mounting to the tank. A fluid outlet and an air inlet are provided in the housing. An inlet check valve and an outlet check valve are provided on the housing for selectively venting the tank. An air filter is mounted over the air inlet to remove airborne contaminants. The check valve assembly may include a pressure gauge, a nitrogen source inlet, and an emergency relief valve.

14 Claims, 6 Drawing Sheets

LIQUID STORAGE VESSEL VENTING SYSTEM

CROSS-REFERENCE TO RELATED APPLICATIONS

The present application is a continuation-in-part of my co-pending U.S. patent application Ser. No. 07/788,542 filed Nov. 6, 1991, entitled WATER SYSTEM (now U.S. Pat. No. 5,240,043).

BACKGROUND OF THE INVENTION

The present invention pertains to liquid storage vessels, and more particularly, to a valve assembly for venting a liquid storage vessel.

Liquids such as water, milk, and juice are stored and transported in large vessels, or tanks. To fill these tanks, air in the tank must be able to escape when the tank is filled with the liquid. To remove liquid from these tanks, air must be drawn into the tank to prevent a vacuum being created by removal of the liquid. Accordingly, a vent is provided to permit air to enter the interior of the tank. Because these vents do not include a filter, unfiltered air is necessarily drawn into the tank to effect removal of the liquid. Such unfiltered air includes airborne contaminants which are introduced to the liquid as it is removed from the tank.

One example of large volume storage vessel is the large container used for water towers which are part of public water supply systems. The container is an elevated tank having a vent for passage of air. These vents may include a screen to keep animals and large insects out (for example, a one inch mesh screen may be used). However, small insects and airborne contaminants enter through these screens, especially when unfiltered air is drawn into the tower tank as the water is discharged therefrom. Where the air includes a high level of contaminants, the contaminants may compromise the safety of the water. Typically, additional quantities of chlorine are added to the water to kill any bacteria introduced to the water by the air entering through the vent. However, it is undesirable to add additional chemicals in drinking water since these chemicals detrimentally effect the taste of the water and may present their own health risk.

Another example of such storage vessels are tank trucks which are utilized to transport milk, juice and other beverages from a source to a bottling plant. These trucks require a vent for passage of air when the tank is loaded and unloaded. Although the vent may be closed during transportation and storage; however, since the tank vents do not include a filtration system, the liquid contents will be effected by airborne contaminants entering through the vent during loading and unloading of the tank.

Accordingly, it is desirable to provide a system for decreasing the amount of contaminants drawn into a storage or transportation vessel during emptying of a tank and permitting venting during filling. It is preferable to provide such a system in a manner which avoids the necessity of adding large quantities of chemicals to the liquid. It is further desirable that the vent be provided by a relatively low cost, readily retrofittable, mechanism.

SUMMARY OF THE INVENTION

A check valve assembly is provided for a liquid storage vessel such as a tank. The check valve assembly includes a housing for mounting to the storage tank. A fluid outlet and an air inlet are provided in the housing. A check valve is coupled to the outlet such that it allows fluid to exit the housing through the outlet, but prevents air entering through the outlet. A check valve is also coupled to the inlet such that it allows air to enter the housing through the inlet, but prevents fluid exiting through the inlet. An air filter is positioned adjacent the air inlet such that all air entering the housing is filtered to remove airborne contaminants.

According to narrower aspects of the invention, the check valve assembly housing connection is sealed to the storage vessel and thereby to prevent air from entering at the connection point. The check valve assembly can include a pressure gauge for monitoring the pressure in the check valve housing and the storage vessel. A nitrogen source or, other substantially water insoluble gas supply, can be connected to the assembly housing to supply a gas to the interior of the storage vessel which replaces the liquids removed front the tank, and thereby to prevent a vacuum being created in the storage tank as liquid is removed. An emergency relief valve may also be provided on the housing. A liquid inlet and outlet for the vessel may be provided by a single check valve positioned at the bottom of the vessel.

The valve assembly provides a versatile system for controlling the flow of gases into and out of a liquid storage vessel. A relief valve effects a fluid outlet through which fluids, such as gasses, may exit the tank. An air inlet provides the sole path for air into the vessel, and air must pass through an air filter to enter the vessel through the inlet. Accordingly, airborne contaminants are removed before they enter the vessel, thereby protecting the quality of liquids in the vessel.

These and other features, objects and advantages of the present invention will become apparent by reading the following description thereof, together with reference to the accompanying drawings, in which:

DETAILED DESCRIPTION OF THE PREFERRED EMBODIMENTS

Figure 1:
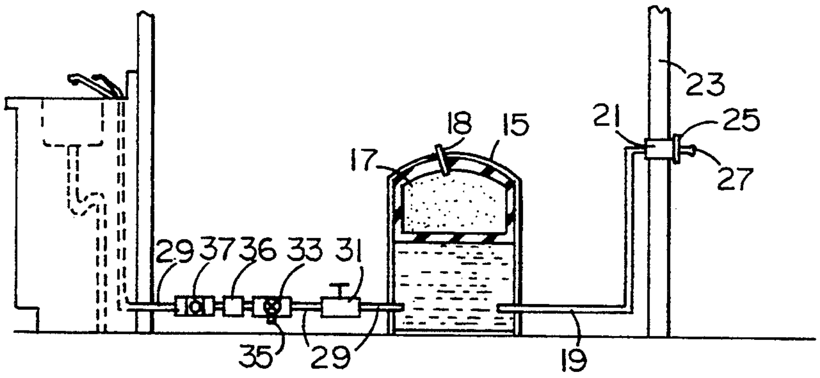
FIG. 1 is a side elevational view, partially in section, of a water storage system.

Referring to FIG. 1, the first embodiment of a water storage system of the present invention is shown. The storage system includes a tank 15 which has a pressurized bladder 17 mounted in the upper portion of the tank. Bladder 17 usually contains compressed air at 20–40 psi to determine the water pressure for the system. Pressurized air can be added to tim bladder through valve 18. The tank is connected to an input conduit 19 which is connected to a receiving valve 21 mounted in the wall of the home or building 23. Receiving valve 21 has a cover 25 which contains a lock actuated by a key 27. Cover 25 protects receiving valve 21 from contaminants and vandalism and maintains the overall integrity of the water system. On the output side of the system, a conduit 29 is connected to tank 15. A valve 31, preferably a gate valve, is in the output conduit. Valve 31 can be used to seal the water tank from the internal plumbing of the building. A sampling valve 33 is provided in conduit 29. Valve 33 has an output 35 from which water samples can be drawn in periodically testing the quality of the water in the system. A pressure regulator 36 controls the pressure of the water entering the building. A separate pressure regulator enables the water in tank 15 to be stored at a higher pressure than the pressure of the water in the building system. A check valve 37 is provided to protect the integrity of the high quality water system and to protect the system from any possible backflow from the building plumbing. The system of FIG. 1 is particularly useful where the amount of bulk, high quality water needed is limited, for example, in a typical residence.

Figure 2:
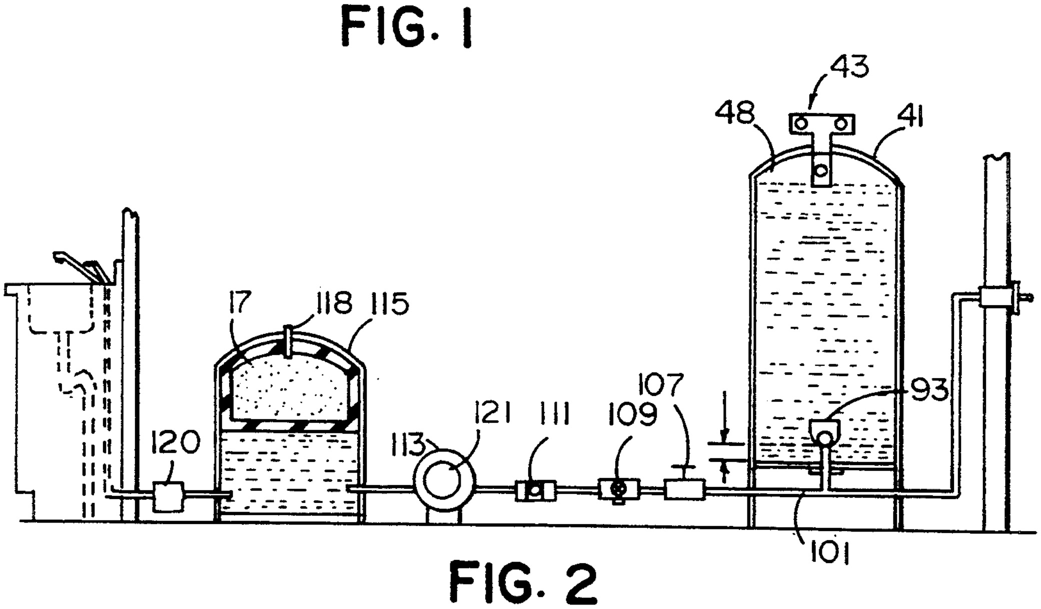
FIG. 2 is a side elevational view, partially in section, of a second embodiment of a water storage system.

FIG. 2 shows a second embodiment of the water system suitable for use in a large commercial installation which would require large amounts of water. The system can employ a large tank 41 capable of holding several hundred gallons of high quality water. Several tanks of the same or of different sizes can also be connected together to provide sufficient water storage capacity. Tank 41 should preferably be lined or coated with an organic polymeric material such as an epoxy-type polymer. The tank can also be lined with glass. The lining is used to protect the large volume of water contained in the tank from picking up any metallic taste from the tank. For example, if tank 41 is made of steel it is possible for rust to form on the inner surface of the tank which would add an undesirable iron taste to the water in the tank. On the top of tank 41 is mounted a three-way check valve 43 which plays an important roll in both the filling and emptying of tank 41. An enlarged view of valve 43 is shown in FIG. 9.

The three check valves included in valve 43 are preferably mounted in a T-shaped housing 45. The first check valve 47 is mounted in the vertical leg of the "T" and includes a lower perforated plate or screen 49 which is held in a circumferential support 51. Plate 49 is perforated so that water can rise in the vertical leg of housing 45 as tank 41 is filled. A second plate 53 is mounted in the vertical leg above plate 49. Plate 53 has a shaped aperture 55 which forms a tightly fitting valve seat for the floating valve member 57. As shown in FIG. 9, the floating valve member is in the form of a ball which would be of low enough density to be supported by the water as the water fills the vertical leg of the "T." Floating valve member 57 is captured between the upper and lower plates 49 and 53, respectively, and rises under the influence of the water to seat itself firmly in valve seat 55, stopping the addition of any more water to the tank. As shown in FIG. 2, the vertical leg of the T-shaped housing extends downwardly into the top of tank 41. When check valve 47 closes, a quantity of air 48 is trapped in the top of the tank. The trapped air protects the tank from filling completely and provides a cushion for the water pump in the bulk delivery system.

Figure 9:
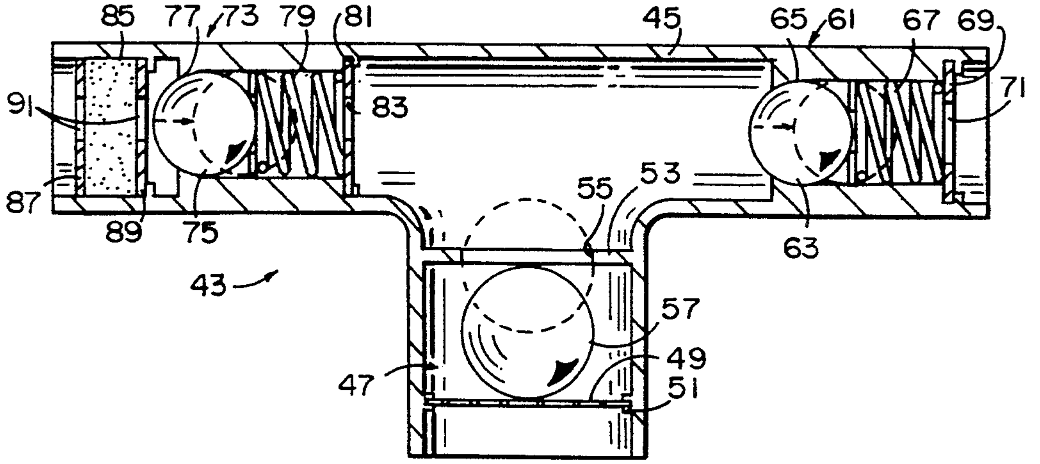
FIG. 9 is a sectional view of a three-way check valve.

A second check valve 61 is mounted in the right-hand side of the T-shaped housing, as shown in FIG. 9. As water fills tank 41, the air trapped above the water is forced upwardly into the vertical leg of housing 43 where it passes through floating check valve 47 and can then escape the tank through check valve 61. Check valve 61 has a movable valve member 63 which is shown in the form of a ball. The valve member can also be in the form of a hinge member or even a living hinge in a plastic housing. Ball 63 is normally biased to the closed position in a valve seat 65 by a coil spring 67 which rests against a plate 69. Plate 69 has an aperture 71 through which the air can escape as it passes check ball 63. When check valve 47 closes, and air is no longer being forced out of tank 41, spring 67 forces check valve ball 63 into position against valve seat 65 closing check valve 61.

As water is drawn out of tank 41, air must enter the top of the tank to protect the tank from possible collapse under the force of atmospheric pressure and to prevent a partial vacuum from forming which would interfere with the draining of the tank. A check valve 73 is provided in the left arm of T-shaped housing 45, as shown in FIG. 9. Check valve 73 is similar to check valve 61; however, check valve 73 only allows air to enter tank 41 and does not allow air to escape from the tank. Check valve 73 has a check ball 75 which is normally biased to the closed position against a valve seat 77 by a coil spring 79. Coil spring 79 pushes against a plate 81 which has an aperture 83 therein to allow air to enter tank 41.

In order to protect the integrity of the high quality water stored in tank 41, a filter 85 is mounted in housing 45 in front of check valve 73. The filter used can be selected to cope with the contaminants in the air in the vicinity of large storage tank 41. A compound or multi-layer filter can be used, for example, with coarse porous paper or fabric for dust and large particulate material, fine porous material for biological contaminants and activated charcoal for organic materials. Filter layer 85 is contained between two support plates 87 and 89 each of which has an aperture 91 disposed in its center. Plates 87 and 89 can also be replaced by a metal screen material or a metal framework to provide greater access to filter media 85.

Figure 11:
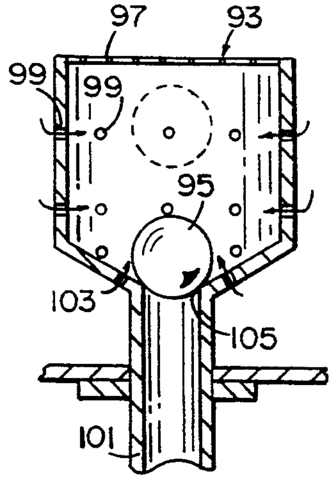
FIG. 11 is a sectional view of a second embodiment of a floating check valve.

The water in tank 41 drains through an outlet valve 93 (FIG. 11). Valve 93 is mounted at the outlet at the bottom of water tank 41 and has a floating ball member 95 contained within a porous trap 97. Valve 93 is preferably of a circular configuration having apertures 99 disposed about its surface so that water can freely enter and exit through an outlet conduit 101. The bottom of valve 93 has a sloping wall 103 leading to a valve seat 105. When tank 41 is filled with water, valve ball 95 will rise to the top of container 97 where it is trapped and prevented from floating freely in the water tank. As the water level drops in tank 41, ball 95 will eventually come to rest on valve seat 105 stopping any additional water from exiting the system.

Figure 10:
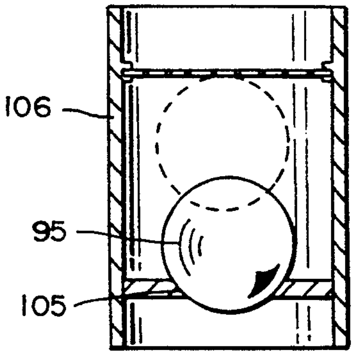
FIG. 10 is a sectional view of a floating check valve.

The valve of FIG. 10 is similar to the valve of FIG. 11 but would preferably be used in in-line applications. Housing 106 can be made sufficiently large so that the flow of water through the valve does not cause ball 95 to be pushed onto valve seat 105.

For simplicity, the floating valve sealing member is illustrated as a ball. Other float configurations can be used, as well as other forms of valves, to suit particular water system requirements.

Water outlet pipe 101 (FIG. 2) has a valve 107 for shutting off the entire system and a sampling valve 109 so that periodic samples of water can be tested to determine the purity of the water. A check valve 111 is provided to prevent any backflow from the remainder of the water system into bulk storage tank 41. A pump 113 is provided to force water into a smaller water tank 115, which contains an inflated bladder 117, which is pressurized through valve 118 similar to that described in FIG. 1. A pressure regulator 120 determines the pressure of the water entering the building. An outlet pipe 119 connects smaller tank 115 to the building water system. Pump 113 is equipped with a pressure sensitive switch 121 which will shut off the pump when it senses the increase in pressure caused by check valve ball 95 entering valve seat 105. As pump 113 continues to pump, pressure sensitive switch 121 turns off the pump. The disabling of pump 113 alerts the users of the water system that the main storage tank needs to be refilled and that the only water remaining in the system is the water contained in tank 115. Tank 41 is filled through a similar input system as that shown in FIG. 1.

As shown in FIGS. 1 and 2, the water is in the small tank while the pressurizing air is contained within an expandable bladder. It is clearly within the scope of the present invention to reverse this relationship to put the water into an expandable bladder and the air directly into the tank. In the latter case the tank would not have to be coated to protect the water from picking up any taste from the metal.

Figure 3:
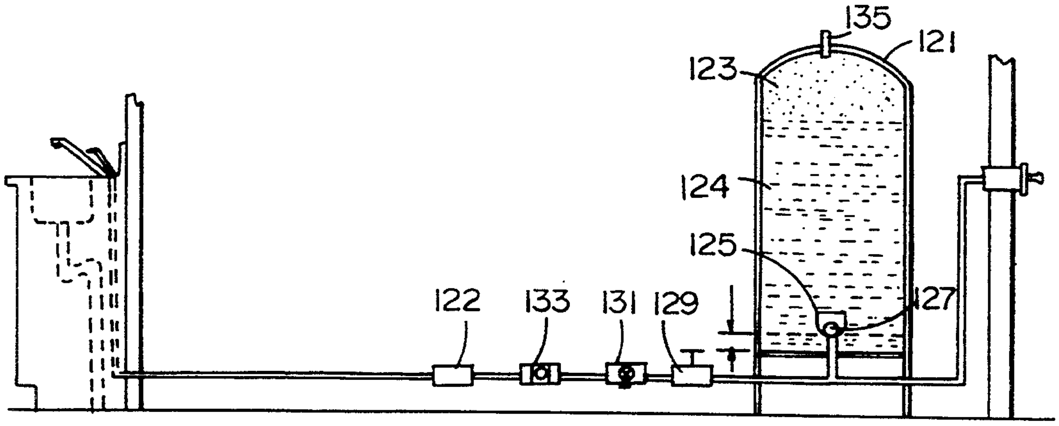
FIG. 3 is a side elevational view, partially in section, of a third embodiment of a water storage system.

The water system of FIG. 3 can be used for either a residential or a small commercial establishment. The water system employs a tank 121 which, like tank 41, is preferably coated on the interior surface with a material to protect the water from picking up any metallic taste. In this system, as well as the systems of FIG. 2, nonmetallic tanks can be used. For example, the shell of the tank can be made of fiberglass reinforced plastic wound with fiberglass and epoxy resin. The input system for tank 121 is the same as that shown in FIGS. 1 and 2. In the top of tank 121, a predetermined volume of a substantially water insoluble, harmless gas 123 such as air or nitrogen is contained. The gas can be added to the top of the tank through valve 135 which can be similar to the conventional valves used to inflate automobile and bicycle tires. Water 124 enters the tank and in rising compresses gas 123 putting pressure on the water system similar to the previously described tanks employing a flexible bladder. The outlet of tank 121 employs a floating valve member 125 similar to valve 93. As the water lowers in tank 121, valve ball 127 will come to rest on the valve seat shutting off or stopping the flow of water before any of gas 123 can escape from tank 121. As in FIG. 3, tank 121 has a main system valve 129, a sampling valve 131, a check valve 133 for protecting the integrity of water 124 stored in tank 121, and a pressure regulator 122. A pressure regulator can be included in valves 129 or 131 or in check valve 133 to limit the water pressure applied to the building plumbing.

Figure 4:
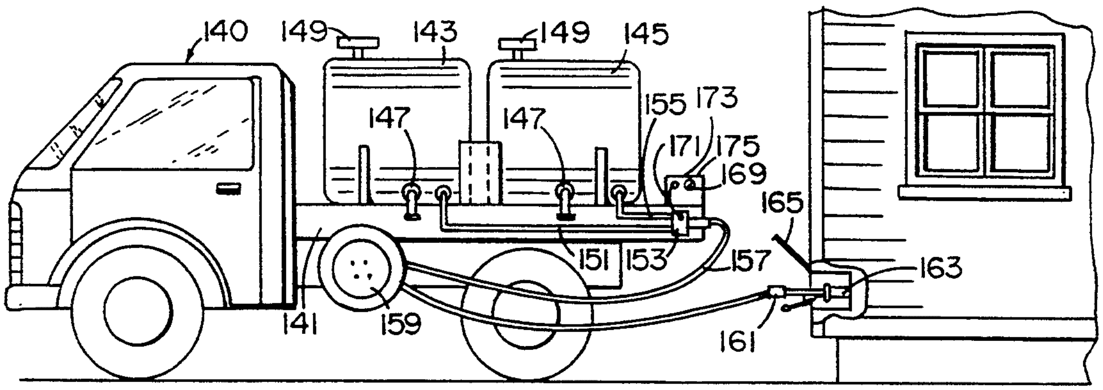
FIG. 4 is an elevational view of a water hauling vehicle connected to deliver water.

As shown in FIG. 4, the water hauling vehicle is illustrated in the form of a flat bed truck 140 having a conventional cab and supporting wheels. The truck has a frame 141 upon which are, schematically represented, bulk water hauling tanks 143 and 145. Both of the bulk water hauling tanks are filled from the bottom through connections 147. Each of the tanks has an air filter 149 mounted at the top to release air from the tank as the tank is filled from the bottom and to filter incoming air to displace the water as the tanks are emptied. The type of filter materials used in filters 149 depends on the environment in which the water hauling vehicle will be operating. As discussed in relation to FIG. 9, a single or compound, multi-layer filter can be used to remove particulate, biological and chemical materials front the air entering bulk water hauling tanks 143 and 145.

Tank 143 is connected by an outlet pipe 151 to a pump 153 which pressurizes the water and delivers it to the customer. Tank 145 has a similar outlet pipe 155 connected to pump 153. The operator of the truck can select the particular tank to be emptied for the customer. Tanks 143 and 145 can carry high quality potable water, as well as distilled water, depending on customer needs. A delivery hose 157 is stored on a reel 159 and is connected by a delivery valve 161 to the customer's receiving valve 163. As shown in FIG. 4, receiving valve 163 is recessed into the home and is normally protected by a flap or door 165. In all of the northern states, and particularly in areas where the temperature can drop below the freezing temperature of water, the receiving valve should be mounted so that the valve seat and the valve body cannot become frozen or cracked.

As discussed in relation to the water system of FIG. 2, using the three-way check valve of FIG. 9, the water is pumped into storage tank 41 until check valve 47 closes. A pressure sensitive switch 169 is connected to pump 153 by an electrical conductor 171. When the pressure of pump 153 rises due to the closing of check valve 47, pressure sensitive switch 169 shuts off the pump and stops the delivery of water. Pump 153 is preferably a centrifugal pump which inherently can provide a cushion when the check valve on the storage tank closes. When the water delivery stops, a metering valve 173 can print out a receipt or bill 175 for the customer indicating the quantity of water delivered. Valve 161 can then be disconnected from valve 163 and water hauling vehicle 140 can move on to another customer.

Figure 5:
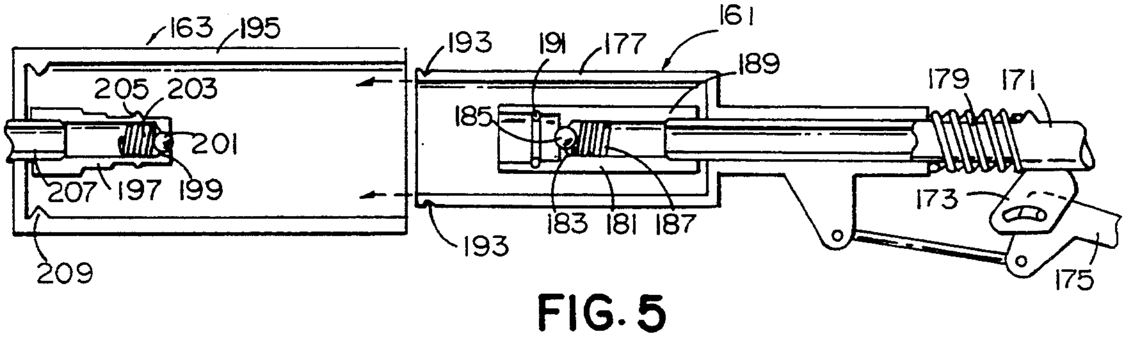
FIG. 5 is a schematic side elevational view, partially in section, showing a water delivery valve and a water receiving valve.
Figure 6:
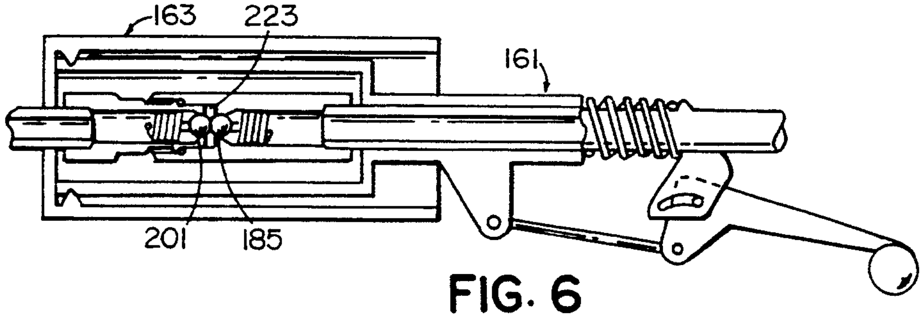
FIG. 6 is a schematic side elevational view, partially in section, showing the water delivery valve locked to the water receiving valve.
Figure 7:
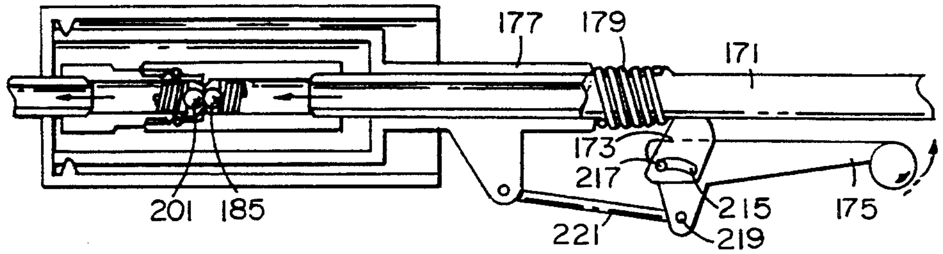
FIG. 7 is a schematic side elevational view, partially in section, showing the water delivery valve and the water receiving valve both open for the transfer of water.

Now referring to FIGS. 5, 6 and 7, water delivery valve 161 is shown. The delivery valve has a tubular frame 171 upon which is mounted a support 173 for a valve operating handle 175. A sleeve 177 is coaxially mounted on tubular frame 171 and is biased away from operating handle support 173 by a coil spring 179. At the end of tubular frame 171 a valve member 181 is mounted. Valve 181 has a valve seat 183 upon which a ball valve closure member 185 is normally biased by a spring 187. A portion of ball member 185 projects outwardly beyond the end of valve 181. A sleeve 189 surrounds valve 181 and extends ahead of ball valve member 185. Sleeve 189 has an internal circumferential gasket 191 therein. Movable shell 177, which surrounds fixed sleeve 189, has a locking member 193 on its outer surface.

Receiving valve 163 has a stationary outer shell 195 which normally projects through the wall of a residence or commercial building, as shown in FIGS. 1-3. Shell 195 can be made of metal or plastic. Fixed shell 195 is long enough so that receiving valve 197 can be recessed into a freeze-free area in the building. Valve 197 has a valve seat 199 upon which a ball valve member 201 is normally biased by a coil spring 203. A circumferential shoulder 205 is on the outer surface of valve 197. Valve 197 closes off the input conduit 207 to the water storage system in the residence or commercial building. Within fixed shell 195 is a locking member 209 which interacts with locking members 193 on the outer surface of movable shell 177 on the delivery valve. Locking members 193 and 209 can be a half thread or a pair of lugs and a channel for receiving the lugs. When movable shell 177 enters fixed shell 195, and is moved to the rear end of the fixed shell, delivery valve 161 can be given a partial turn to lock members 193 and 209 together.

As shown in FIG. 6, delivery valve 161 is locked to receiving valve 163 with ball members 201 and 185 in surface contact. The circumferential shoulder 205 on valve 197 is pressed tightly against gasket 191 in fixed sleeve 189 on the delivery valve. In this position the two valves are locked together for the air-free transfer of water from the bulk hauling system into the storage system. The locations of gasket 191 and shoulder 205 can be reversed on the delivery and receiving valves without affecting the operation of the valves. It is very important that air not enter the system through the two valves to reduce the risk of contamination of the delivered water and the water storage system. Also, it is important to limit the amount of air that enters the water storage tank so as not to reduce the water capacity of the tank with unnecessary air.

While valves 181 and 197 have been illustrated with ball-shaped sealing members, it is clearly within the scope of the present invention to use other shaped sealing members. For example, each ball can be replaced by a sealing member in the form of a truncated cone. The valve springs can hold the cones against the valve seats until the sealing members are pushed back when the flat ends of the cones are pushed together.

As shown in FIG. 7, operating handle 175 is compressed toward tubular frame 171 which forces the entire assembly forward pushing back ball valve members 201 and 185 enabling water to flow from the delivery system into the receiving system. Actuating handle 175 can be held by the operator compressing spring 179. In order to avoid operator fatigue, if a large volume of water is to be delivered, a slot 215 is provided in handle support 173. A pivot pin 217 on the operating handle can slide forward in slot 215 putting the pivot point of pin 217 ahead of pivot point 219 for connecting rod 221 which is connected to movable shell 177. In this position, the operating handle is in effect toggled and will stay in this position without being held. When the automatic pump on the bulk water hauling system turns the pump off, the operator can release handle 175 from the toggle position, closing both the delivery valve and the receiving valve. The delivery valve can then be given an opposite twist to disconnect locking members 193 and 209, separating the two valves. When the two valves separate, the small amount of water trapped in a cavity 223 formed between gasket 191 and the front of the delivery valve washes off the ends of the two valves. The system is then closed and the delivery valve can be withdrawn from the receiving valve.

Figure 8:
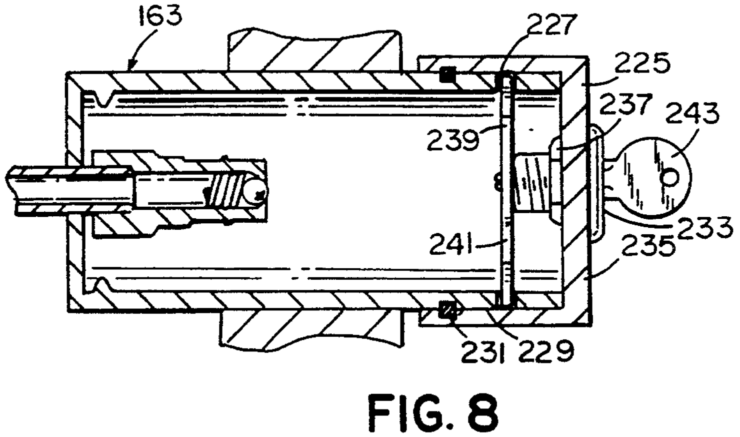
FIG. 8 is a side elevational view, partially in section, showing a water receiving valve mounted in a wall with a locked cover in place.
Figure 12:
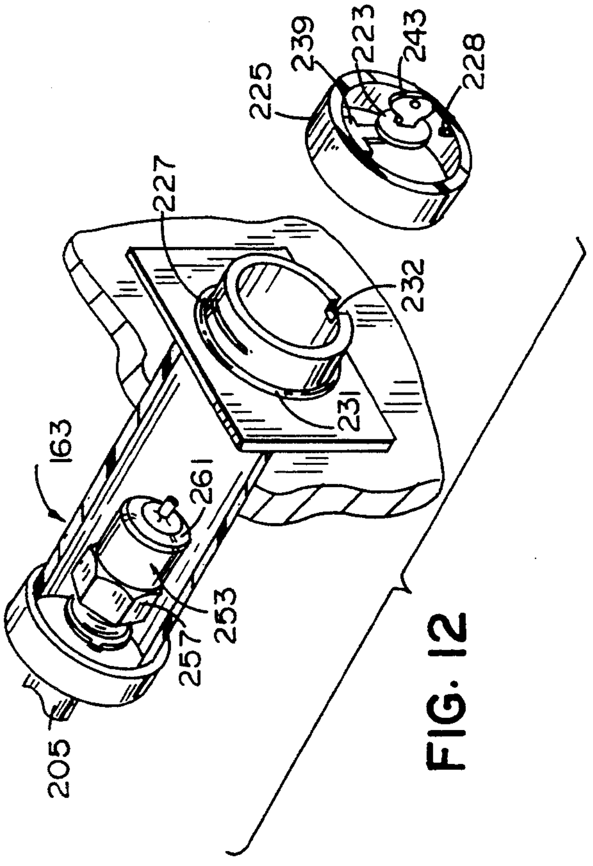
FIG. 12 is an exploded sectional view of a water receiving valve with cover removed.

In order to protect receiving valve 197 from contamination and vandalism, a locking cover 225 is provided (FIGS. 8 and 12). In the preferred embodiment, receiving valve 163 has an aperture 227 in the top and a slot 232 in the bottom. The slot preferably has an offset portion similar to that used with a bayonet connector. On the outer surface of the sleeve an O-ring 231 can be mounted. Cap 225 has an elongated shell which can butt up against O-ring 231 substantially sealing receiving valve 163 from any contamination. A pin 228 projects upwardly from the bottom of cap 225. The pin can slide into slot 232 and, by turning the cap into the offset portion of the slot, keep the bottom of the cap from being pried out. In the center of cap 225 is mounted a lock 233 which is fastened to a surface 235 of cover 225 by a threaded nut 237 which can be tightened against the back of the cover. A locking member 239 is caused to extend into aperture 227 when a key 243 is turned in the lock. The locking member and pin being offset prevent the cap from being pried off. A spring loaded locking member can also be used to automatically lock the cover when it is pushed back into place by the delivery person. The use of lock 233 and O-ring 231 substantially seals receiving valve 163, protecting it from both contamination and vandalism, thereby maintaining the integrity of the high quality water system.

Figure 14:
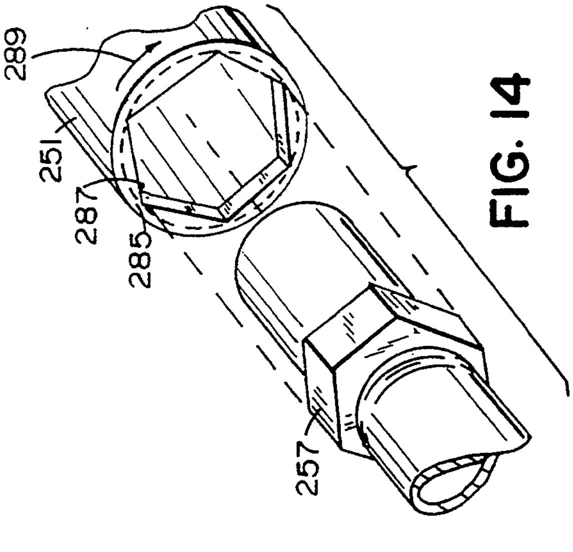
FIG. 14 is an exploded view of the metal-to-metal lock used with the valves of FIG. 13.
Figure 13:
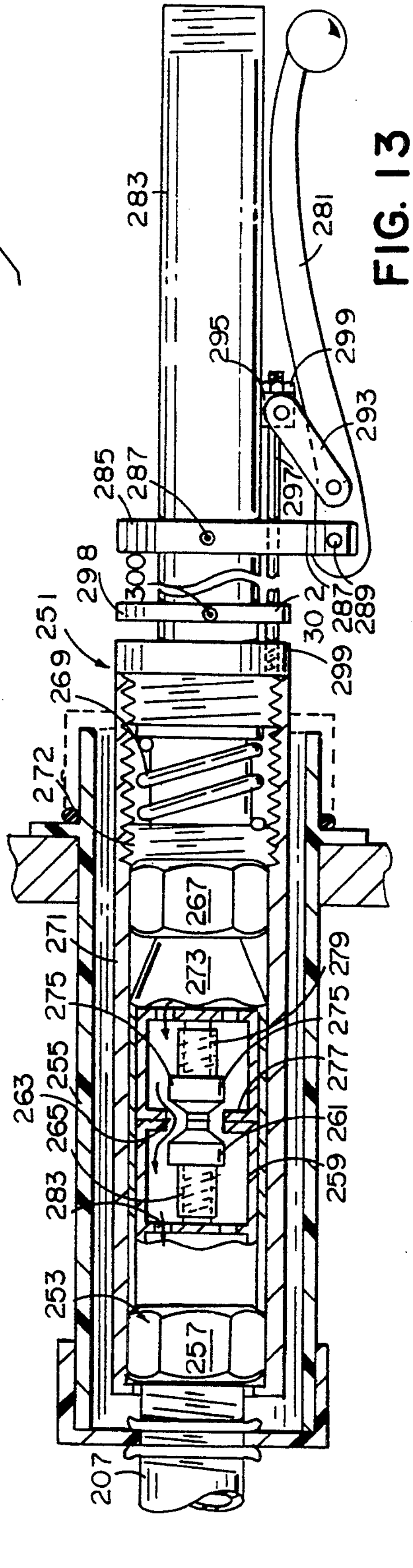
FIG. 13 is a sectional view showing a second embodiment of the water receiving and delivery valves locked together.

In FIGS. 5, 6 and 7 the delivery valve and receiving valves can be locked together using locking members on each outer shell. Since in many installations the outer shell of receiving valve will be made of plastic, a stronger combination of the delivery and receiving valves is preferred. Referring to FIGS. 13 and 14, delivery valve 251 is shown connected to a receiving valve 253. The receiving valve is mounted in a plastic protective shell 255 similar to the shell used with valve 163. Receiving valve 253 has a large coupling nut 257 for attaching the receiving valve body to pipe 207 which connects to the water system inside the residence or building. A metal, preferably brass, valve housing 259 is used for the receiving valve. Within valve body 259 a truncated cone sealing or shut-off member 261 is provided. Sealing member 261 is forced into contact with valve seat 263 by a coil spring 265.

Delivery valve 251 has an internally threaded nut 267 which connects the valve to tubular member 283. Delivery valve 25 1 has a coil spring 269 for biasing the outer sleeve 271 of the valve. The coil spring presses against a ring 272 which is threaded into sleeve 271. Coil spring 269 also biases operating handle 281 to the normally off position and to the locked position when handle 281 is pressed against pipe 283 during delivery of water. The valve body 273, preferably made of brass, is threaded onto the end of pipe 283. Within valve body 273 there is a truncated, cone-shaped sealing member 275 which is urged against a valve seat 277 by a coil spring 279. An actuating handle 281 is fastened to tubular member 283. The actuating handle is attached by means of a split locking ring 285 which is held in place by a screw 287. The split ring 285 has a pair of substantially identical extending portions 287 which provide a support for a pivot pin 289.

One end of handle 281 is pivotally supported by pivot pin 289. A link 293 connects between handle 281 and an end piece 295 which is mounted on the end of an actuating rod 297. Actuating rod 297 extends parallel to tubular member 283 and passes through end piece 295 where it is held by a nut 299 threaded onto the end of the rod. A guide ring 298 is mounted on pipe 283 by set screws 300. Guide ring 298 has an aperture 302 through which actuating rod 297 extends. Guide ring 298 protects actuating rod 297 from being bent during use of the valve. End piece 299 is threadedly attached to shell 271.

End piece 295 can be used to adjust the throw of handle 281 so that it will releasably lock itself in place with the delivery valve in the open position. Spring 269 will keep handle 281 pressed against tubular member 283. This enables the delivery person to release his or her grip on handle 281 when a large quantity of water is being delivered. Since the delivery truck is equipped with an automatic shut-off pump, the water will stop flowing when the receiving tank is full. The delivery person then starts movement of handle 281 away from the delivery position and coil spring 269 will move the handle back to the valve closed position.

As shown in FIG. 13, delivery valve 251 and receiving valve 253 are coupled for the substantially air-free delivery of water. It can be seen that when the actuating handle 281 is pulled or compressed toward the valve body of the delivery valve is pushed forward causing these two sealing members to be pushed back off their valve seats to allow water to flow through the valves, as shown by the arrows 283.

Now referring to FIG. 14, coupling nut 257 of the receiving valve can be seen to have a hexagonal outer surface. Delivery valve 251 has a shaped closure 285 with a hexagonal aperture or cutout 287 which can slide over coupling nut 257. When delivery valve 251 has passed over coupling nut 257, the valve is given a partial twist, as indicated by the arrow 289, which turns the hexagonal aperture in valve 25 1 out of alignment with hexagonal coupling nut 257 bringing the back portion of coupling member 285 into contact with the back of the coupling nut providing a tight metal-to-metal seal between the two delivery valves. Handle 281 can then be actuated to initiate the flow of water. The delivery and receiving valves, as shown in FIGS. 13 and 14, are the preferred valves since they provide a tight metal-to-metal connection for the substantially air-free delivery of water without contacting or gripping the plastic shell which is used to protect the receiving valve from contamination and vandalism. As in the case of the previously described delivery and receiving valves, when the delivery handle is released the small amount of water contained between the two valves flushes off the face of the valves maintaining the cleanliness of the receiving valve. The delivery valve can be removed and cap 225 put in place and locked as described in relation to FIGS. 8 and 12.

Figure 15:
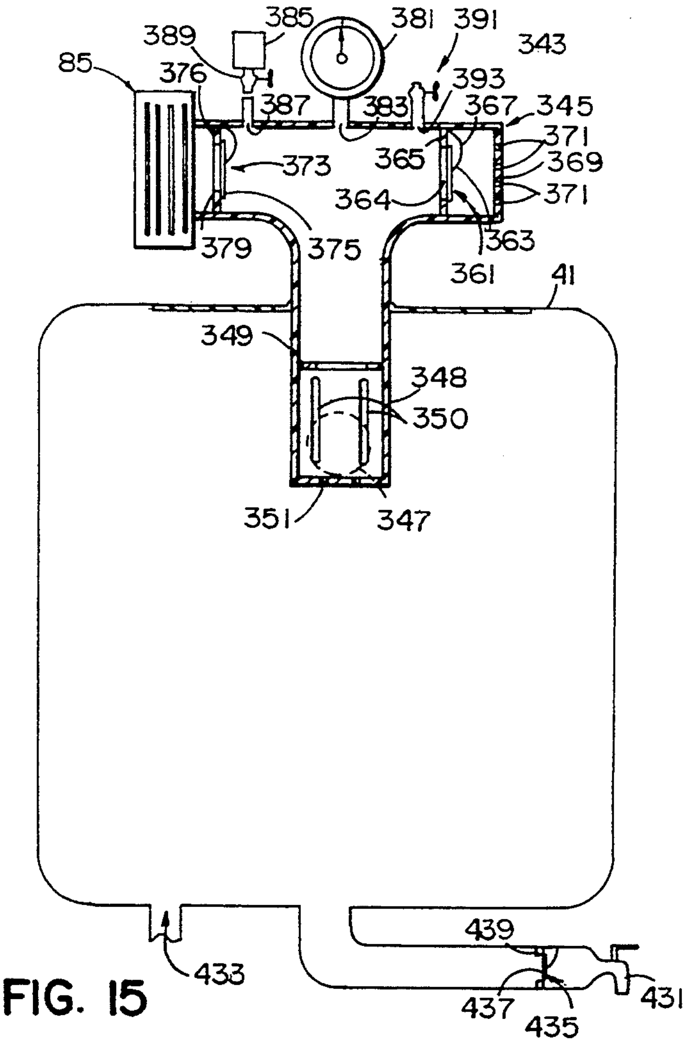
FIG. 15 is a sectional view of an alternate embodiment of the check valve according to FIG. 9 mounted on a storage vessel with a manually actuated outlet.

An alternate embodiment 343 of a check valve is shown in FIG. 15. The two check valves included in valve 343 are preferably mounted in a T-shaped housing 345. Housing 345 includes a leg 348 for insertion through the top of tank 41. A seal is formed between the leg and tank using a suitable means, such as by welding, if the tank 41 and housing 343 are metal, use of a rubber grommet (not shown), ultrasonic welding if tank 41 and housing 343 are plastic, or the like, so air does not pass between leg 348 and tank 41. A valve seat 349 and a lower perforated plate or screen 351, which is integrally formed with housing 345 or mounted in a circumferential support (not shown) is provided for an optional check valve 347. The optional check valve, if provided, is identical to check valve 47 (FIG. 9). Leg 348 (FIG. 15) includes slots 350 and through which liquid enters the leg.

A check valve 361 is mounted in the right-hand side of the T-shaped housing, as shown in FIG. 15. As water fills tank 41, the air trapped above the water is forced upwardly into the vertical leg 348 of housing 343, where it can escape the tank through check valve 361. Check valve 361 has a movable valve member 363 which is shown as a disc 364. The valve member can be in the form of a resilient plastic or metal member having a living hinge or a plastic or metal member including a hinge 367 coupled to a valve seat 365. Disc 364 is normally biased closed against valve seat 365 by the pressure differential between the interior of housing 345 and the relatively higher ambient air pressure outside the housing. A plate 369 has apertures 371 through which the air can escape as it passes disc 364 when the gas pressure inside tank 41 exceeds the ambient air pressure outside tank 41. Check valve plate 364 is pulled into position against valve seat 365, closing check valve 361, when the ambient air pressure rises above the gas pressure in tank 41.

As described above, as water is drawn out of tank 41, air must enter the top of the tank to protect the tank from possible collapse under the force of atmospheric pressure and to prevent a partial vacuum from forming which would interfere with the draining of the tank. A check valve 373 is provided in the left arm of T-shaped housing 345, as shown in FIG. 15. Check valve 373 is similar to check valve 361; however, cheek valve 373 only allows air to enter tank 41 and does not allow air to escape from the tank. Check valve 373 has a disc 375 similar to disc 364. Disc 375 is normally biased to the closed position against a valve seat 376 by the pressure differential between ambient air pressure outside the tank and pressure within the housing 345. When the air pressure in housing 345 drops below the ambient air pressure outside tank 41, disc 375 is pulled away from valve seat 376, to allow air to pass through aperture 379.

In order to protect the integrity of the liquid in tank 41, a filter 85 is mounted to housing 345 in front of check valve 373. The filter used is selected to cope with contaminants in the air in the vicinity of the large storage tank, as described above.

T-shaped housing 345, according to an alternate embodiment, includes a pressure gauge 381, as also shown in FIG. 15. Pressure gauge 381 is coupled to the interior of housing 345 through a conduit 383. The pressure gauge is of any suitable, commercially available type, which visually identifies the pressure inside housing 345. The pressure gauge is indicates that a vacuum has been created within the housing, or that excess pressure has built up inside the housing, and thus within tank 41.

This pressure information will, for example, identify valve failures. If valve 373 fails, or if filter 85 is not cleaned or replaced over a long time period such that it no longer effectively passes air, a vacuum is created when liquid is removed from tank 41. If valve 343 fails, pressure will build up inside tank 41 and housing 345. The pressure gauge will detect either of these conditions and provide a visual or audible warning.

In order to adjust the pressure in housing 345 (FIG. 15) and to compensate for these variations in pressure, a source of low pressure pharmaceutical nitrogen 385 is connected to housing 345 through inlet 387. The nitrogen is supplied through a control valve 389, which may be provided by any suitable manual valve or an automatic valve which opens to supply gas to the tank when the ratio of the pressure of the gas in the tank to the pressure of the nitrogen in source 385 drops below a threshold level. The nitrogen flows into housing 345 at low pressure to replace liquid removed from the tank. The pressure differential threshold at which valve 389 opens is preferably less than that at which valve 373 opens, such that air will only be drawn into housing 345 through valve 373 if the nitrogen source is exhausted. A manually actuated emergency relief valve 391 is also connected to housing 345 through a conduit 393. This relief valve is manually or automatically opened to discharge gases from housing 345 if the pressure in the housing is too high due to a failure of valve 361. Accordingly, the system pressure is controlled, and the integrity of the liquids is protected, by the nitrogen source 385 and the emergency relief valve 391.

Figure 16:
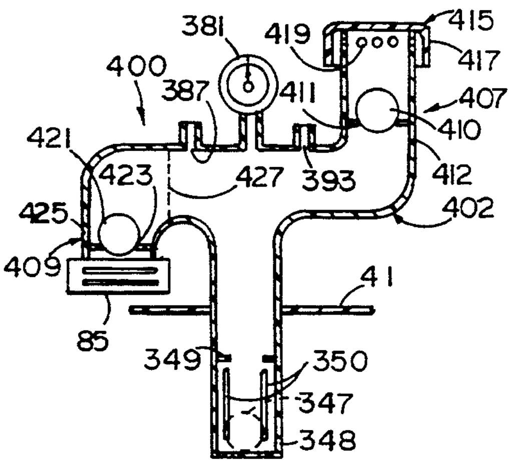
FIG. 16 is a sectional view of another alternate embodiment of the check valve according to FIG. 9.

Yet another alternate embodiment 400 of the two check valve assembly is shown in FIG. 16. This alternate embodiment includes housing 402 having an outlet check valve 407 and an inlet check valve 409. Valve 407 includes a moving ball 410. Ball 410 normally sits in an aperture 411 in valve seat 412. When the gas pressure in housing 345 rises to a level sufficient to lift the ball 410 out of the seat, gas flows past ball 410 and out through an outlet 415. The weight of ball 410 establishes a pressure differential threshold at which the ball will be lifted and gas released. Outlet 415 includes a closed cap 417 and apertures 419. The cap 417 prevents airborne items from falling into housing 402, while apertures 419 provide a lateral passage through which gas can flow out to exit between housing 402 and cap 417.

With continued reference to FIG. 16, inlet valve 409 includes a moving ball 421 which normally rests in an aperture 423 and a valve seat 425. Ball 421 will rise out of the valve seat when air pressure in housing 345 drops below the ambient air pressure. Air will flow around the valve member into housing 345. A screen 427 prevents member 421 from leaving the left-hand side of housing 345. Air entering through inlet valve 409 passes through filter 85. A valve 389 (FIG. 15), a nitrogen source 385, and an emergency relief valve 391 can be connected to housing 402 in the same manner as described above with respect to valve assembly 343 FIG. 15.

According to the embodiment of the invention illustrated in FIG. 15, liquid in tank 41 is emptied through a manually actuated valve 431 and filled through an inlet opening 433. An outlet check valve 435 is provided ahead of outlet 43 1 to prevent air from entering tank 41 through valve 431, when the tank is emptied. Valve 435 includes a hinged disc 437, which normally rests on valve seat 439. Disc 437 may be provided by a resilient plastic or metallic member having a living hinge or a substantially rigid member connected to a hinge. When liquid exits through valve 431, disc 437 is displaced from seat 439, allowing the liquid to leave tank 41 through the outlet valve 431.

Figure 17:
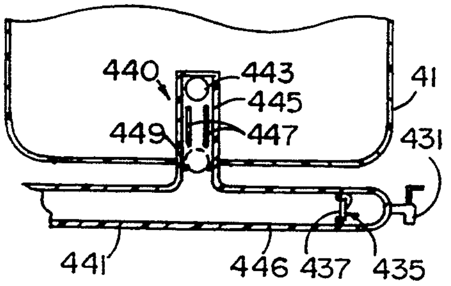
FIG. 17 is a sectional view of another alternate embodiment of the floating check valve according to FIG. 10 and liquid outlet.

Another alternate embodiment of an inlet/outlet value 440 is illustrated in FIG. 17. Liquid enters the tank through conduit 441. The liquid will push a floating ball 443 to the top of a leg 445 where it is trapped. Liquid will thus enter tank 41 through slots 447 in leg 445. Liquid is drained through a conduit 446 and valve 431. When the liquid in tank 41 is completely discharged, ball 443 will rest on valve seat 449, sealing the tank, and preventing internal gases, such as nitrogen, in tank 41, from exiting through valve 431.

Figure 18:
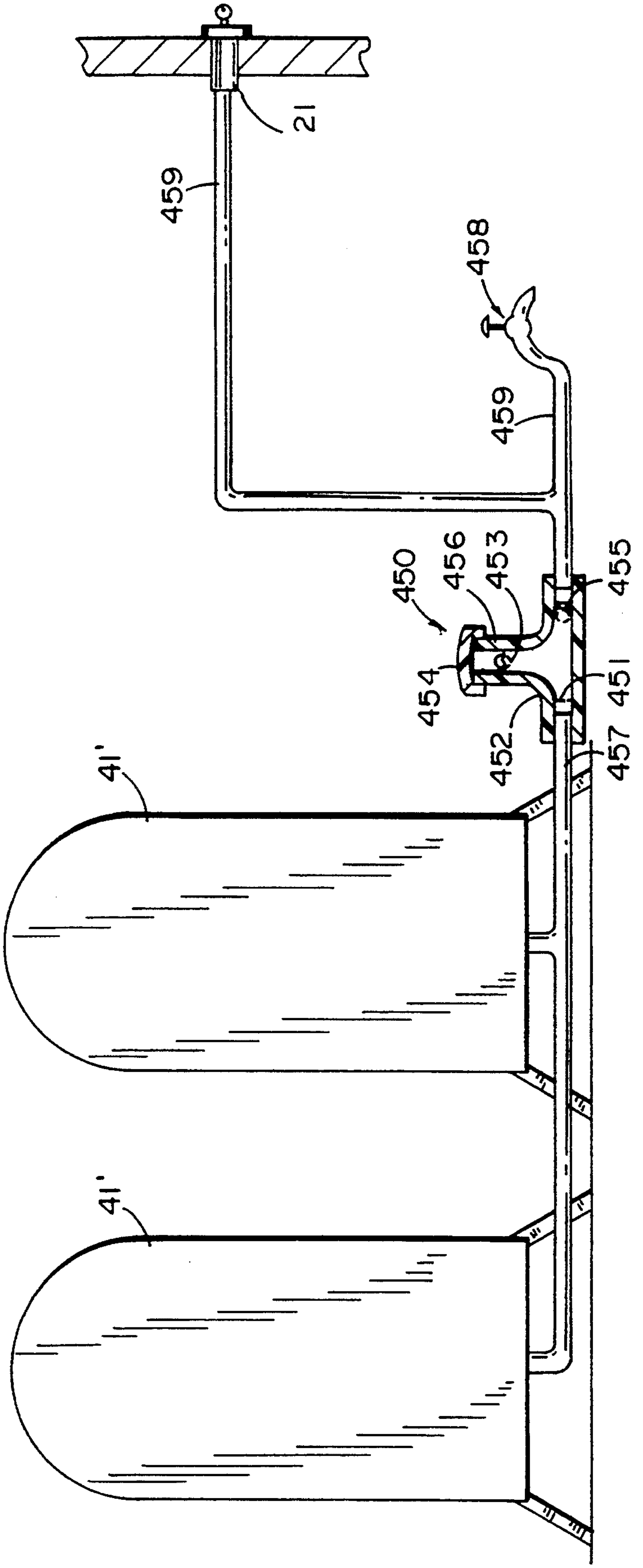
FIG. 18 is a line side elevational view of a system including an in-line floating check valve shown in section view.

Another embodiment of the inlet/outlet valve 450, which is an in-line valve, is shown in FIG. 18. The valve includes a body 452 and a cap 454 which is connected to the body in any suitable, conventional manner such as by welding, applying an adhesive, or use of a grommet, such that gas does not pass between the body and the cap. Body 452 is also connected to conduits 457 and 459 by any suitable, conventional sealing means such as an adhesive, a weldment, or a grommet. The ball moves between leg 456 and valve seat 455. Valve 450 is connected to one or more tanks 41' through conduit 457. Valve 450 is connected to receiving valve 21 and manually actuated outlet valve 458 through a conduit 459. Valve 450 includes a screen 451, a floating ball 453 and a valve seat 455. A substantially water insoluble gas is initially introduced to tanks 41' through conduit 459, valve 450 and conduit 457. Liquid for tanks 41' is also introduced through receiving valve 21, conduits 459, 457 and valve 450 after the initial gas supply is input to the system. When gas or liquid initially enters valve 450 through conduit 459, ball 453 is pushed off valve seat 455 and rises into leg 456 where it is trapped. Air will also be trapped in leg 456, which air is compressed such that it prevents liquid from filling leg 456. The ball remains in the leg until the liquid is drained front tanks 41'. The ball will drop with the falling liquid level. Screen 451 is provided to insure that ball 453 does not inadvertently enter conduit 457. The ball is pulled against valve seat 455 as the last of the liquid passes out through conduit 459. The ball will thus sit on valve seat 455 to prevent system gasses, such as nitrogen in tanks 41', from exiting through valve 450.

The use of the low pressure nitrogen, the check valve assembly 400 (FIG. 16), and an inlet/outlet valve 440 (FIG. 17), 450 (FIG. 18), allows the system to operate in a closed, sterile, controlled manner. When the nitrogen builds up pressure in tank 41, check valve 407 will hold nitrogen in the tank as long as the pressure in the tank is below a threshold at which ball 410 is lifted off seat 412. Thus, the weight of ball 410 sets a threshold for releasing gas. When the liquid is removed from tank 41, valve 409 will remain closed as long as the nitrogen supply replaces the volume of liquid removed, such that the nitrogen holds ball 421 in seat 425. If an insufficient supply of nitrogen is provided, the air will be drawn through filter 85 when ball 421 rises, to prevent collapse of the tank or creation of a vacuum. Use of the floating ball 443 (FIG. 17) or 453 (FIG. 18) in the inlet/outlet valve, prevents the nitrogen from exiting the container through the liquid output valve 431 when the liquid is removed from the tank. The nitrogen will thus remain in the tank to keep the tank purged of contaminants, and maintain a sterile environment, when liquid is removed from the tank.

It can be seen from the above description that a complete high quality liquid storage system is provided. Great care has been taken throughout the system to protect the liquid from contamination. In the case of drinking water, in order to even further protect the water, many states require that a small quantity of chlorine be added to the water. This can be done at the time the bulk water tanks are filled so that the entire water delivery system only contains water containing chlorine sufficient to control any health problem while at the same time not adding a chlorine taste to the water, thus preserving the fresh taste.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows;

1. A storage system for liquid comprising:

a receiving valve for the transfer of liquid into said storage system;

a storage tank communicating with said receiving valve for receiving and storing said liquid;

a check valve assembly communicating with said storage tank, said check, valve assembly comprising:

a first check valve including a valve seat and a floating valve which allows air to pass around said floating valve as said storage tank is being filled with liquid and for closing said first check valve when said floating valve is buoyed by said water into said valve seat;

a second check valve including a valve closure in communication with said first check valve, said second check valve only allowing air to flow out of said storage tank;

a third check valve in communication with said first check valve, said third check valve including a valve closure only allowing air to flow into said storage tank; and an air filter for filtering the air passing through said third check valve into said storage tank.

2. A storage system for liquid water as set forth in claim 1, wherein said first, second and third check valves are all positioned within a single housing carried on said tank.

3. A storage system for liquid as set forth in claim 2, wherein said housing is T-shaped and said first check valve is in the vertical leg of said "T" and the second and third check valves are in opposite arms of said housing.

4. A storage system for liquid as set forth in claim 3, further including an outlet valve for removal of liquid from said tank.

5. A storage system for liquid as set forth in claim 4, further including a monitor for determining the fluid pressure in said housing.

6. A storage system for liquid as set forth in claim 5, further including a means for controlling the fluid pressure in said housing.

7. A storage system for liquid as set forth in claim 6, wherein said controlling means includes a source of low pressure nitrogen.

8. A storage system for liquid as set forth in claim 7, wherein said controlling means further includes a pressure relief valve.

9. A storage system for liquid as set forth in claim 1, including an outlet valve for removal of liquid from said storage tank.

10. A storage system for liquid as set forth in claim 1, including a monitor for determining the fluid pressure in said storage tank.

11. A storage system for liquid as set forth in claim 1, including means for controlling the fluid pressure in said storage tank.

12. A storage system for liquid as set forth in claim 1, including a source of low pressure nitrogen communicating with said storage tank.

13. A storage system for liquid as set forth in claim 1, including a pressure relief valve communicating with said storage tank.

14. A storage system for high quality liquids comprising:

a receiving valve for substantially air-free transfer of high quality liquid into said storage system;

a storage tank communicating with said receiving valve for receiving and storing high quality liquid therein;

a predetermined quantity of a substantially water insoluble harmless gas confided in a top portion of said storage tank;

an in-line valve adapted to selectively pass high quality liquid into and out of a bottom portion of said storage tank, while maintaining said gas in said storage tank; and in-line valve including:

a body having a first leg with a valve seat therein communicating with said receiving valve, a second leg communicating with said storage tank, and a closed third leg capturing a portion of said gas therein;

a floating valve element disposed within said body, and shaped to be floatingly shifted into said third leg when high quality liquid is in said storage tank, and fall against said seat when high quality liquid is drained from said storage tank so as to retain said gas therein.

* * * * *